United States Patent Office 3,049,909
Patented Aug. 21, 1962

3,049,909
SAMPLING SYSTEM FOR AMMONIA-CONTAINING GASES
John C. Thomas, Phillips, Tex., assignor to Phillips Petroleum Company, a corporation of Delaware
Filed Oct. 5, 1959, Ser. No. 844,533
6 Claims. (Cl. 73—23)

This invention relates to the removal of ammonia from synthesis gas prior to the analysis of a sample of the synthesis gas in a conventional chromatographic analyzer. In another aspect it relates to a sampling system for the continuous selective adsorption of ammonia from a synthesis gas stream in silica gel beds in preparation for automatic chromatographic analysis of the synthesis gas.

In ammonia synthesis plants, there is a need for frequent measurement of the ratio of hydrogen to nitrogen, preferably 3 to 1, in the synthesis gas feed passing to the reactor for ammonia synthesis. Plant experience has shown that use of a chromatographic analyzer is the most practical method of effecting commercial-scale analysis of synthesis gas.

An economical ammonia synthesis process, by definition, requires the continuous recycling of the hydrogen and nitrogen which did not combine to form $NH_3$ on a single pass through the reactor. The effluent from the reactor is thus mostly a mixture of $H_2$, $N_2$, and $NH_3$. The product $NH_3$ is separated, by conventional means, such as water washing, from the unreacted gases to as practical extent as possible. Necessarily, a small amount of ammonia is still entrained in the unreacted, recycled synthesis gas which is combined with fresh synthesis gas feed. The combined stream contains from 1 to 2 percent ammonia.

A small part of this combined feed stream is continuously diverted to a measuring device which includes a chromatographic analyzer for periodic measurement of the $H_2$-$N_2$ ratio. Experience has shown that even the relatively low concentration of $NH_3$ in the recycled synthesis gas is strongly adsorbed by chromatographic columns, and is quite difficult to remove by the usual purging. Consequently, after a period of use these columns must be shut down and replaced, as the presence of $NH_3$ in a chromatographic column adversely affects the reliability of the readings designed to indicate $H_2$-$N_2$ concentration.

I have discovered a method of treating the sample stream of synthesis gas, before it passes to the chromatographic column, which will obviate adsorption of ammonia therein and its aforementioned deleterious effects on the $H_2$-$N_2$ analysis.

The method of my invention is to continuously draw the sample gas through one of two columns containing adsorbent beds which will selectively adsorb the ammonia from the sample of synthesis gas. While one of the columns is adsorbing $NH_3$, the other is being regenerated so that continuous sampling of the main synthesis gas stream, and ammonia removal therefrom, is possible.

The chromatographic column, however, only periodically admits the sample stream for $H_2$-$N_2$ measurement. This method gives a gas sample that has a composition that is proportional to the concentration of all constituents of the synthesis gas, except ammonia. Suitable selective adsorbents for ammonia include silica gel, activated carbon and activated alumina.

It is an object of this invention to provide a method for the removal of ammonia from a synthesis gas stream prior to the determination of hydrogen and nitrogen content therein by a chromatographic analyzer.

It is another object to provide a system for gas analysis which functions continuously to sample synthesis gas and adsorb ammonia therefrom, permitting the operation of a chromatographic analyzer without adverse effects on accuracy resulting from a build-up of ammonia therein.

It is a further object to provide a continuously operable adsorption system, which entails ammonia adsorption in one column while an alternate adsorption column is being regenerated, and then conversely.

Various other objects, advantages and features of the invention will become apparent from the following description and drawing, in which.

Figure 1:
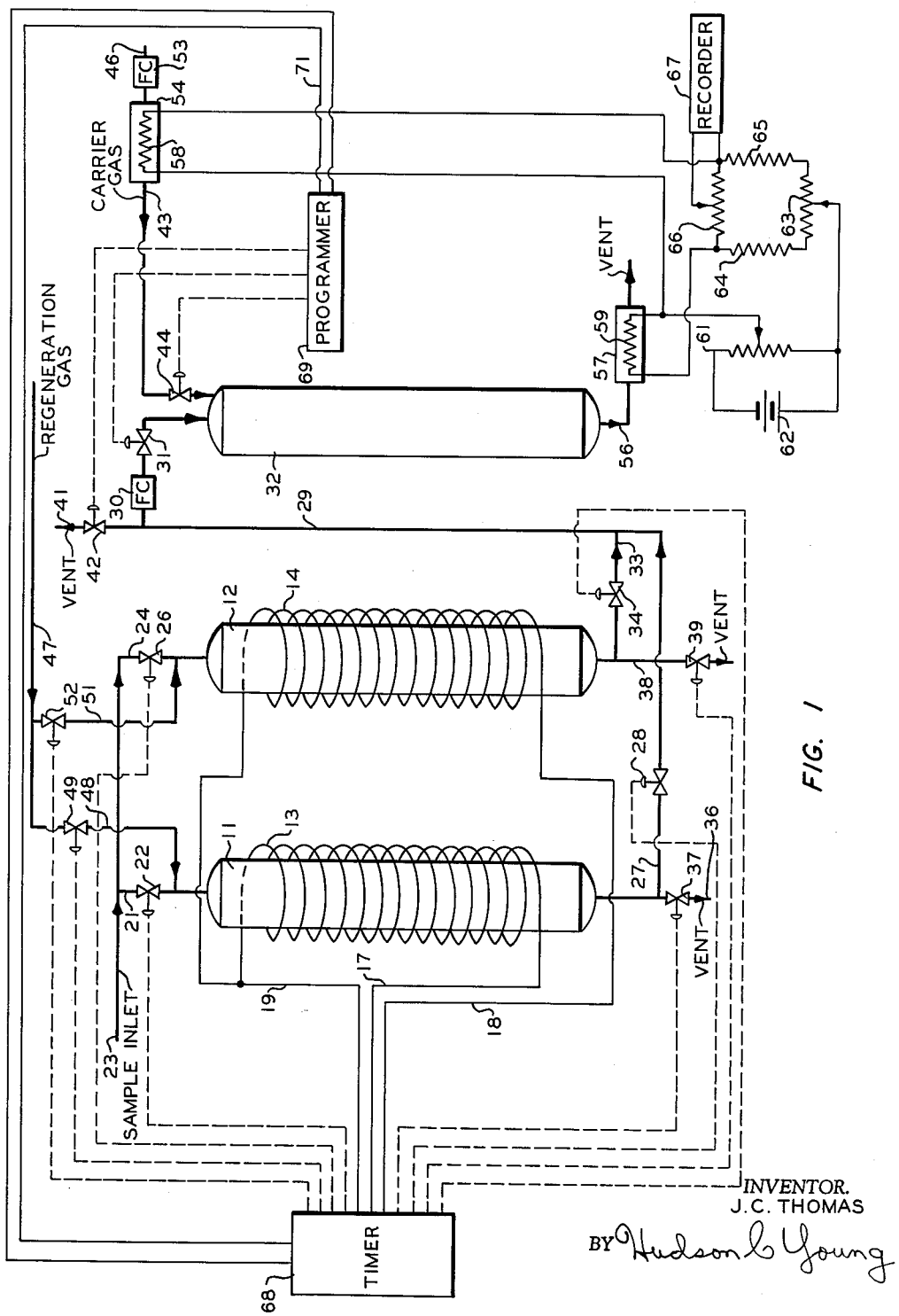
FIGURE 1 is a schematic representation of the sampling system for removing undesirable gases prior to analyzing the gas in a chromatographic analyzer.

Referring now to the drawing, in which like parts have been designated with like reference numerals, and to FIGURE 1 in particular, there are shown two columns 11 and 12 which are filled with a packing material that selectively adsorbs ammonia gas, preferably silica gel. Columns 11 and 12 are wound with electrical heating elements 13 and 14, respectively. Operation of heaters 13 and 14 is controlled by timer 68.

A conduit 21, having a valve 22 therein, communicates between sample inlet conduit 23 and the inlet of column 11. A conduit 24, having a valve 26 therein, communicates between conduit 23 and the inlet of column 12. The outlet of column 11 is connected, by conduit 27, having a valve 28 therein, and a conduit 29, having a flow controller 30 and a valve 31 therein, to the inlet of chromatographic column 32, which contains a selective adsorbent. The outlet of column 12 is also connected by a conduit 33, which has a valve 34 therein, to conduit 29. A vent conduit 36, having a valve 37 therein, communicates with the outlet of column 11. A vent conduit 38, having a valve 39 therein, communicates with the outlet of column 12. A vent conduit 41, having a valve 42 therein, communicates with conduit 29. A conduit 43, having a valve 44 therein, communicates between carrier gas supply conduit 46 and the inlet of column 32. A regeneration gas, which can be the same as the carrier gas, is introduced into the system through a conduit 47. A conduit 48, having a valve 49 therein, communicates between regeneration gas conduit 47 and the inlet of column 11. A conduit 51, having a valve 52 therein, communicates between conduit 47 and the inlet of column 12.

Carrier gas supply conduit 46 has a flow controller 53 and a thermal conductivity cell 54 therein. The outlet of column 32 is in communication with a vent conduit 56 having a second thermal conductivity cell 57 therein. Thermal conductivity cells 54 and 57 have respective thermistors 58 and 59 therein, which are in thermal contact with gases flowing through respective conduits 46 and 56. The first terminals of thermistors 58 and 59 are connected to one another and to the contactor of potentiometer 61. A voltage source 62 is connected across the end terminals of potentiometer 61. One end terminal of potentiometer 61 is connected to the contactor of a potentiometer 63. The first end terminal of potentiometer 63 is connected through a resistor 64 to the second terminal of thermistor 59. The second end terminal of potentiometer 63 is connected through a resistor 65 to the second terminal of thermistor 58. The end terminals of a potentiometer 66 are connected to the respective second terminals of thermistors 58 and 59. The contactor and one end terminal of potentiometer 66 are connected to the respective input terminals of a recorder 67.

It should be evident that thermistors 58 and 59, and the circuit elements associated therewith, form a modified Wheatstone bridge network such that the signal applied to recorder 67 is representative of the difference in the thermal conductivities of the gases in contact with respective thermistors 58 and 59. Recorder 67 thus provides a signal which indicates differences in composition of the gases flowing through conduits 46 and 56.

Valves 22, 49, 52, 26, 37, 28, 39 and 34 are operated either manually or in the sequence described hereinafter by means of a timer 68.

Valves 31, 42 and 44 are operated either manually, or in the sequence described hereinafter, by means of programmer 69. Such a programmer is described in copending application Serial No. 678,059, filed August 14, 1957, now Patent No. 2,982,123. Timer 68 and programmer 69 are in electrical communication via lines 71. Timer 68 comprises: a plurality of cams; a timing motor; a four pole, double throw, impulse ratchet relay; two delay relays; A.C. and D.C. power supplies; and an autotransformer, all of which are described in detail in FIGURE 2.

Figure 2:
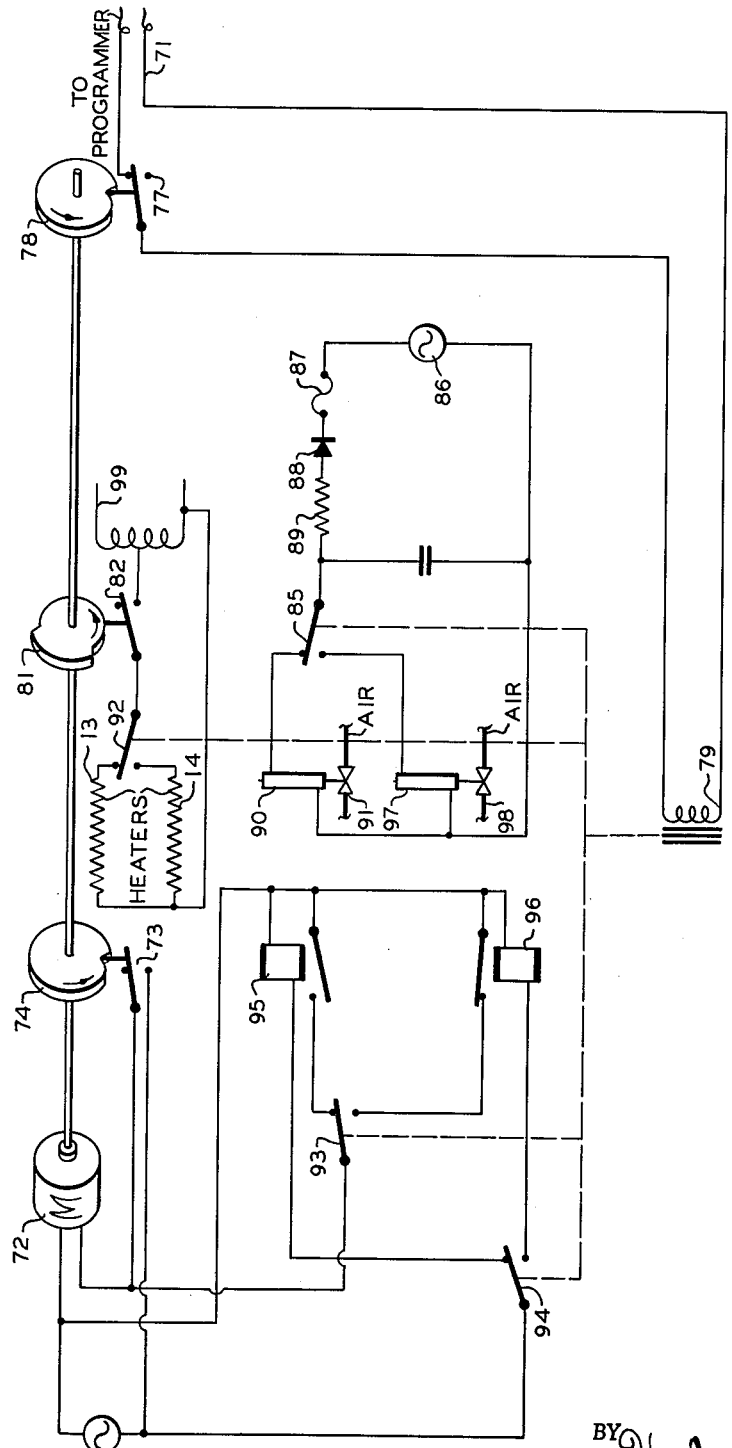
FIGURE 2 is a schematic view of the timer mechanism employed in this sampling system.

In FIGURE 2, the sequence of operation is as follows: With the timing motor 72 at time zero, switch 73 is held open by cam 74 and the timing motor does not run (relay 95 is also open). Switch 77 is held closed by cam 78, and ratchet relay 79 is connected to the instrument programmer 69 (not shown) by lines 71. Cam 81 is holding switch 82 open and thus no power is applied to the heaters 13 or 14. Switch 85 is directing D.C. current, from A.C. power supply 86, through fuse 87, rectifier 88 and resistor 89, to energize solenoid 90 which operates master valve 91 in the instrument air line, controlling valves 22, 28, 37 and 49 on column 11 of FIGURE 1, so as to maintain the column in the adsorption period. Solenoid 97 is not being energized, so that master valve 98 is closed, and no instrument air is flowing to valves 26, 34, 39 and 52 on column 12, thereby maintaining column 12 in the regeneration period.

Each time chromatographic column 32 of FIGURE 1 samples the synthesis gas, and at the completion of the sampling period or shortly thereafter, programmer 69 furnishes an electrical impulse which if switch 77 is closed, is applied to relay 79, which ratchets and changes the position of switches 85, 92, 93 and 94. When switches 93 and 94 change position, the timer motor 72 starts through time delay relay 96. Motor 72 drives cam 74 to close switch 73, and also drives cam 78 to open switch 77, before relay 96 opens. With switch 77 open, ratchet relay 79 cannot be operated for a period of 180 minutes, so that the adsorption and regeneration periods of columns 11 and 12 of FIGURE 1 are on a 180 minute cycle. With the operation of ratchet relay 79, the valves 26, 33, 39 and 52 of column 12 are actuated through switch 85, solenoid 97, and master valve 98, putting column 12 in the adsorption period. Simultaneously, the valves 22, 28, 37 and 49 on column 11 reverse, putting it in the regeneration period. The heater windings 13 on column 11 are connected to switch 82 (still open) through switch 92.

Ten minutes after the start of the timer cycle, switch 82 is closed by cam 81 and a fixed amount of current is applied to heater 13 of column 11 to facilitate the stripping out of adsorbed components by the passage of regeneration gas. The amount of current is controlled by adjusting the contactor on autotransformer 99. 80 minutes after the start of the timer cycle, cam 81 opens switch 82 to remove current input to heater 13, permitting column 11 to cool for the remaining 100 minutes of the timer cycle.

At the end of 180 minutes, cam 74 opens switch 73 to stop motor 72. Also, cam 78 closes switch 77 to permit starting of the next timer cycle by the operation of ratchet relay 79. In the next timer cycle, the operation of columns 11 and 12 is reversed.

In operation, chromatographic column 32 operates on a time sequence independent of the timer cycle of the columns 11 and 12. In one embodiment, programmer 69 operates valves 31, 42, and 44 of FIGURE 1 on an eight minute time cycle. At the beginning of the programmer cycle, valve 31 is closed and valves 42 and 44 are open, so that sample gas from inlet conduit 29 is being vented through conduit 41. Carrier gas is flowing into column 32 through conduit 43, and is being vented from column 32 through conduit 56. Programmer 69 operates to open valve 31 and close valve 42 for a preset time interval, so that a predetermined quantity of sample gas flows from conduit 29 through flow controller 30 and valve 31 into column 32. After the preset time interval expires, valve 31 is again closed and valve 42 opened so that the sample gas is vented for the remainder of the programmer cycle.

The carrier gas carries the sample gas through column 32, which contains an adsorbent (such as molecular sieves, manufactured by Linde Company, a Division of Union Carbide Corporation) which selectively retards the passage of the components of the sample gas through column 32. The carrier gas conveys the segregated components from the column through thermal conductivity cell 57. As each component passes over thermistor 59, the current flowing through the bridge circuit varies so that signals proportional to the quantity of each component of the sample gas pass to recorder 67 at spaced time intervals. The recorded signals may be used to determine the ratio of the quantity of two or more components in the sample gas, either manually or automatically.

*Specific Example*

In an ammonia synthesis plant, a part of the combined synthesis gas feed stream, containing 1 to 2 percent ammonia, was passed through the sampling system of this invention. The effluent gas from the adsorption columns contained substantially no ammonia and was passed to the chromatographic analyzer for determination of the hydrogen and nitrogen content. The composition of this ammonia-free gas was as follows:

| | |
|---|---|
| Hydrogen | 57.5 |
| Nitrogen | 23.4 |
| Helium | 11.3 |
| Argon | 7.5 |
| Methane | 1.3 |

The adsorption columns contained silica gel, the chromatographic column contained molecular sieves, manufactured by Linde Company, a Division of Union Carbide Corporation. The adsorbent beds were regenerated with ammonia-free synthesis gas from the synthesis gas production system. Other ammonia-free gases such as air and helium can also be used for regeneration. The chromatographic analyzer operated satisfactorily for a long period because ammonia was being effectively prevented from entering the chromatographic column.

It should be apparent from the foregoing specification that this apparatus can be utilized for the selective adsorption of any component or components from a gas stream which is to be passed through a chromatographic analyzer. It is merely necessary to pack the adsorption columns with a material selective for the components which are to be prevented from passing through the chromatographic column.

While the invention has been described in conjunction with a presently preferred embodiment, it should be evident that it is not limited thereto.

I claim:

1. Apparatus for analyzing a fluid mixture comprising a first and second adsorption column filled with a material which selectively adsorbs one or more of the constituents of said fluid mixture, a first sample inlet conduit communicating with the inlet of said first adsorption column, a second sample inlet conduit communicating with the inlet of said second adsorption column, a first regeneration gas inlet conduit communicating with the inlet of said first adsorption column, a second regeneration gas inlet conduit communicating with the inlet of said second adsorption column, a first outlet conduit on said first adsorption column communicating with a sample inlet conduit on a chromatographic column, said first outlet conduit on said first adsorption column also communicating with a vent conduit, a first outlet conduit on said second adsorption column communicating with said sample inlet conduit on said chromatographic column, said first outlet conduit on said second adsorption column also communicating with a vent outlet, said sample inlet conduit on said chromatographic column having a vent conduit and a pneumatic valve therein, a carrier gas inlet conduit communicating with the inlet of said chromatographic column, said carrier gas inlet conduit having a flow controller and a first thermal conductivity cell therein, said chromatographic column in communication with an outlet vent conduit having a second thermal conductivity cell therein, said thermal conductivity cells having thermistors therein, the terminals of said thermistors being in thermal contact with the gases flowing through said inlet and outlet conduits of said chromatographic column, the terminals of said thermistors being connected to the terminals of a modified Wheatstone bridge network, said bridge being in electrical communication with a recorder, a programmer operating the pneumatic valves on the inlet conduits of said chromatographic column, a timer operating the pneumatic valves on the inlet and outlet conduits of said adsorption columns, and said timer and said programmer being in electrical communication with one another.

2. The method of analyzing an ammonia containing fluid mixture which comprises directing a volume of the mixture to be analyzed to a first zone which selectively adsorbs said ammonia constituent of said fluid mixture, said first zone comprising a pair of adsorption columns operating alternately on adsorption and regeneration periods, passing a regeneration gas comprising ammonia-free synthesis gas through said adsorption columns while they are in said regeneration period, heating said columns during a part of said regeneration period facilitating regeneration of a packing material comprising silica gel disposed in said columns, periodically directing the effluent from said first zone to a second zone which selectively retards passage therethrough of the constituents of the effluent from said first zone, said second zone having a packing susceptible to contamination by said ammonia constituent, continuously passing a carrier gas through said second zone, and measuring a property of the effluent from said second zone which is representative of the composition thereof.

3. The method of analyzing an ammonia containing fluid mixture which comprises directing a volume of the mixture to be analyzed to a first zone which selectively adsorbs at least said ammonia constituent of said fluid mixture, said first zone comprising a pair of adsorption columns operating alternately on adsorption and regeneration periods, passing a regeneration gas comprising ammonia-free synthesis gas through said adsorption columns while they are in said regeneration period, heating said columns during a part of said regeneration period facilitating regeneration of a packing material comprising silica gel disposed in said columns, periodically directing the effluent from said first zone to a second zone which selectively retards passage therethrough of the constituents of the effluent from said first zone, said second zone having a packing susceptible to contamination by said ammonia constituent, continuously passing a carrier gas therethrough said second zone, and comparing the thermal conductivity of the effluent from said second zone with the thermal conductivity of the carrier gas passed to said second zone.

4. The method of analyzing an ammonia containing fluid mixture which comprises directing a volume of the mixture to be analyzed to a first zone which selectively adsorbs said ammonia constituent of said fluid mixture, said first zone comprising a pair of adsorption columns operating alternately on adsorption and regeneration periods, passing a regeneration gas comprising ammonia-free synthesis gas through said adsorption columns while they are in said regeneration period, heating said columns during a part of said regeneration period facilitating regeneration of a packing material comprising silica gel disposed in said columns, periodically directing the effluent from said first zone to a second zone which contains a material which selectively retards passage therethrough of the constituents of the effluent from said first zone, said second zone having a packing susceptible to contamination by said ammonia constituent, continuously passing a carrier gas through said second zone, and comparing the thermal conductivity of the effluent from said second zone with the thermal conductivity of the carrier gas passed to said second zone.

5. Apparatus for analyzing a fluid mixture comprising a first and second adsorption columns filled with a material which selectively adsorbs one or more of the constituents of said fluid mixture, a first sample inlet conduit communicating with the inlet of said first adsorption column, a second sample inlet conduit communicating with the inlet of said second adsorption column, a first regeneration gas inlet conduit communicating with the inlet of said first adsorption column, a second regeneration gas inlet conduit communicating with the inlet of said second adsorption column, a first outlet conduit on said first adsorption column communicating with a sample inlet conduit on a chromatographic column, said first outlet conduit on said first adsorption column also communicating with a vent conduit, a first outlet conduit on said second adsorption column communicating with said sample inlet conduit on said chromatographic column, said first outlet conduit on said second adsorption column also communicating with a vent outlet, said sample inlet conduit on said chromatographic column having a vent conduit and a motor valve therein, a carrier gas inlet conduit communicating with the inlet of said chromatographic column, said carrier gas inlet conduit having a flow controller and a first means for establishing a reference first signal for said carrier gas, said chromatographic column in communication with an outlet vent conduit having a second means for establishing a second signal indicative of the presence of the components of the fluid mixture in the effluent carrier gas stream, means to compare said first and second signals to establish a third signal representative of the concentration of said components in said fluid mixture, said third means being in communication with a recording means, a programmer operating the pneumatic valves on the inlet conduits of said chromatographic column, a timer operating the pneumatic valves on the inlet and outlet conduits of said adsorption column, and said timer and said programmer being in electrical communication with one another.

6. The method of claim 4 wherein said retarding material is molecular sieves.

References Cited in the file of this patent

UNITED STATES PATENTS 2,813,010   Hutchins _____ Nov. 12, 1957
2,882,244   Milton _____ Apr. 14, 1959

OTHER REFERENCES

Article: by Rouit, published in Vapor Phase Chromatography, by Desty, Butterworths Scientific Publications, 1956, pages 291–303. Copy in Patent Office Library.

Article: by Lichtenfels et al., published in Analytical Chemistry, Vol. 28, No. 9, September 1956 pages 1376–1379. Copy in 73–23C.

Article: Gas Chromatography II, by N. H. Ray, in Journal Applied Chemistry, Vol. 4, February 1954, pages 82–85. Copy in 73–23C.

Books: Gas Chromatography by Coates, 1958, Academic Press, N.Y., pages 243, 260. Copy in Pat. Office Lib.

Gas Chromatography by Keulemans, Reinhold Publishing Corp. London, pages 194, 196. Copy in Pat. Office Lib.